J. WINDLE.
LAWN MOWER SHARPENING DEVICE.
APPLICATION FILED OCT. 19, 1912.
1,071,195.
Patented Aug. 26, 1913.
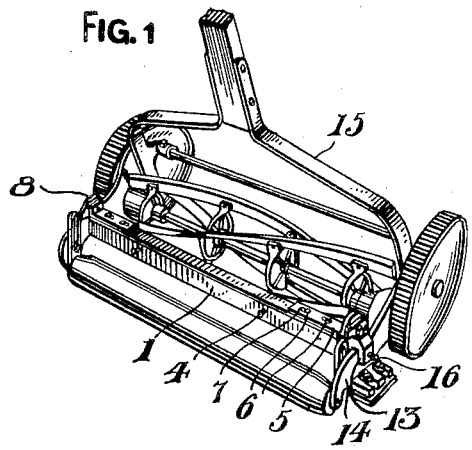
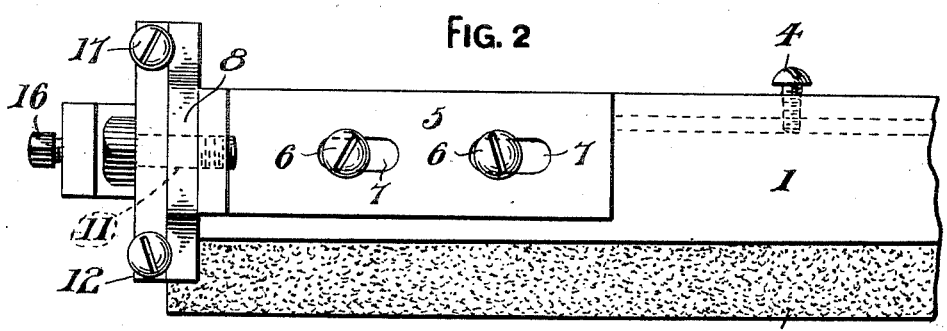
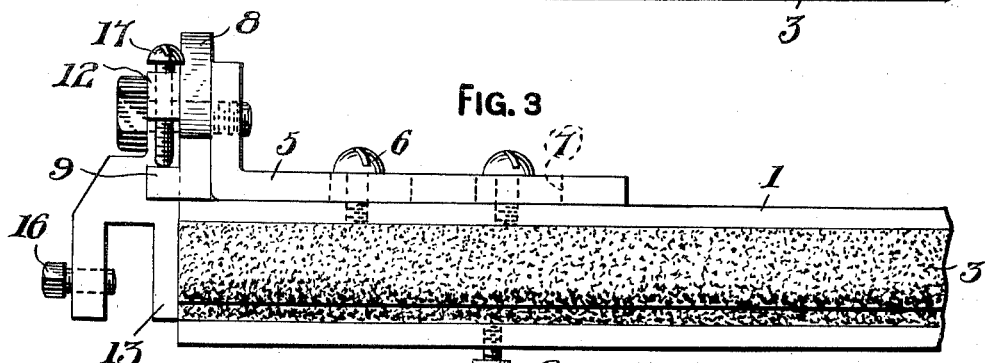
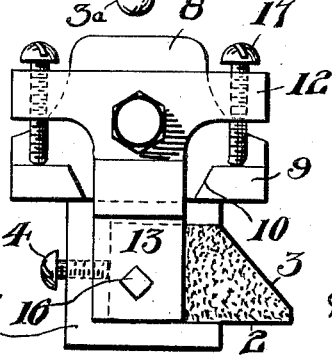
WITNESSES
J. P. Appleman
K. H. Butler
INVENTOR
John Windle
H. C. Evert
ATTORNEYS
COLUMBIA PLANOGRAPH CO., WASHINGTON, D. C.

UNITED STATES PATENT OFFICE.

JOHN WINDLE, OF FOSTORIA, OHIO.

LAWN-MOWER-SHARPENING DEVICE.

1,071,195.  Specification of Letters Patent.  Patented Aug. 26, 1913.

Application filed October 19, 1912. Serial No. 726,673.

*To all whom it may concern:*

Be it known that I, JOHN WINDLE, a citizen of the United States of America, residing at Fostoria, in the county of Seneca and State of Ohio, have invented certain new and useful Improvements in Lawn-Mower-Sharpening Devices, of which the following is a specification, reference being had therein to the accompanying drawing.

This invention relates to a lawn mower sharpening device, and more particularly to a lawn mower attachment that can be easily and quickly placed in position whereby the knives of a lawn mower will be sharpened as the mower is moved.

The primary object of my invention is to furnish a lawn mower with a novel holder for a piece of sharpening material, as emery stone, the holder having novel adjustments whereby the sharpening material can be placed at the proper inclination to engage the beveled cutting edges of the knives of the lawn mower.

Another object of this invention is to provide a sharpener that is applicable to various types of lawn mowers, the sharpener having provision to compensate for wear upon the sharpening material, whereby the device can be used for a long period of time by simply adjusting the same.

A further object of this invention is to provide a lawn mower sharpening device, that is simple in construction, durable, inexpensive to manufacture, and highly efficient for the purposes for which it is intended.

With the above and other objects in view the invention resides in the novel construction, combination and arrangement of parts to be hereinafter specifically described and then claimed.

Reference will now be had to the drawing, wherein:—

Figure 1 is a perspective view of a portion of a lawn mower provided with the device, Fig. 2 is an enlarged plan of a portion of the device, Fig. 3 is a front elevation of the same, and Fig. 4 is an end view of the device.

A device in accordance with this invention comprises a channel-shaped bar 1 serving as a holder for a sharpening material 2, as emery stone, the sharpening material having a beveled edge 3 that protrudes from the open side of the holder and which is maintained within the holder by the clamping screws 3ª, only one shown. The sharpening material is movably arranged within the holder and can be shifted therein by set screws 4 arranged in the back of the bar 1 when the clamping screws 3ª are shifted to release the material 2, said set screws being adjusted to compensate for wear upon the beveled protruding edge of the sharpening material.

The top of the bar 1, at the ends thereof, is provided with angle brackets 5 that are adjustably connected to said bar by set screws 6 extending through slots 7 provided therefor in the brackets 5. The outer ends of the brackets 5 are provided with fixed end plates 8 having outwardly extending lugs 9 at the lower edges thereof, these lugs being arranged at the ends of said plates and in a horizontal plane, with the confronting ends of the lugs of each plate beveled, as at 10. The end plates 8 are provided with outwardly extending trunnions or pivot pins 11 in the form of screws that are tapped into the end plates and the ends of the brackets 5.

Pivotally mounted upon the trunnions 11 are the cross heads 12 of clamps 13 adapted to be secured to the side frames 14 of a lawn mower 15 by set screws 16. The set screws 16 are arranged in the outer sides of the clamps whereby easy access can be had to the same.

The cross heads 12 have the ends thereof provided with set screws 17 that engage the lugs 9, and by adjusting said set screws, the holder of the sharpening material can be tilted whereby the sharpening material will be positioned at the proper angle to be engaged by the cutting edges of the knives of the lawn mower. The beveled ends of the lugs 9 provide clearances when tilting or adjusting the angle of the bar 1, and by adjusting the angle of the bar 1 and from time to time moving the sharpening material in said bar, the device in its entirety can be adjusted to a nicety whereby the knives of the lawn mower will be properly sharpened.

From the foregoing it will be observed that the device embodies clamps supporting a tiltable holder for sharpening material and that provision is made whereby the holder can be locked in a tilted position to correctly present the sharpening material to the knives of the lawn mower.

One embodiment of my invention has been illustrated in the accompanying drawing, but it is to be understood that the structural elements are susceptible to such changes, as in size, shape and manner of assemblage, as fall within the scope of the appended claims.

What I claim is:—

1. A sharpening attachment for lawn mowers comprising a holder, a body of sharpening material adjustably arranged therein, longitudinally adjustable brackets connected to said holder for suspending the same within a lawn mower, end plates fixed to said brackets and provided with trunnions, clamps mounted upon said trunnions and adapted to be fixedly secured to a lawn mower, and means carried by said clamps and engaging said end plates for tilting said holder.

2. A sharpening attachment for lawn mowers comprising a holder, a body of sharpening material adjustably arranged therein, longitudinally adjustable brackets connected to said holder for suspending the same within a lawn mower, end plates fixed to said brackets and provided with trunnions, clamps mounted upon said trunnions and adapted to be fixedly secured to a lawn mower, outwardly projecting lugs integral with said end plates, and adjusting screws carried by said clamps and engaging with said lugs and capable when adjusted to tilt said holder and maintain it in its adjusted position.

In testimony whereof I affix my signature in the presence of witnesses.

JOHN WINDLE.

Witnesses:
 ORA R. WADE,
 MINNIE WADE,
 ROBT. G. MILLER.

---

Copies of this patent may be obtained for five cents each, by addressing the "Commissioner of Patents, Washington, D. C."